(12) United States Patent
Greason et al.

(10) Patent No.: US 7,784,269 B1
(45) Date of Patent: Aug. 31, 2010

(54) SYSTEM AND METHOD FOR COOLING ROCKET ENGINES

(75) Inventors: Jeffrey K. Greason, Tehachapi, CA (US); Daniel L. DeLong, Mojave, CA (US); Douglas B. Jones, Mojave, CA (US)

(73) Assignee: Xcor Aerospace, Mojave, CA (US)

( * ) Notice: Subject to any disclaimer, the term of this patent is extended or adjusted under 35 U.S.C. 154(b) by 1041 days.

(21) Appl. No.: 11/509,905

(22) Filed: Aug. 25, 2006

(51) Int. Cl.
    *F02K 9/00* (2006.01)
(52) U.S. Cl. .......................................... 60/260; 60/257
(58) Field of Classification Search ................ 60/200.1, 60/267, 257, 260; 239/127.1, 127.3
See application file for complete search history.

(56) References Cited

U.S. PATENT DOCUMENTS

| | | | | |
|---|---|---|---|---|
| 3,570,249 A * | 3/1971 | Baum | ........................... | 60/259 |
| 5,025,623 A * | 6/1991 | Hirakoso et al. | .............. | 60/257 |
| 5,101,622 A * | 4/1992 | Bond | ........................... | 60/246 |
| 5,135,184 A * | 8/1992 | Billig | ....................... | 244/53 R |
| 5,644,920 A * | 7/1997 | Lak et al. | ..................... | 62/47.1 |
| 6,052,987 A * | 4/2000 | Dressler | ....................... | 60/260 |
| 6,536,208 B1 * | 3/2003 | Kretschmer | ................... | 60/258 |
| 7,216,477 B1 * | 5/2007 | Erickson et al. | ............... | 60/259 |
| 7,418,814 B1 * | 9/2008 | Greene | ........................ | 60/204 |

* cited by examiner

*Primary Examiner*—Michael Cuff
*Assistant Examiner*—Phutthiwat Wongwian
(74) *Attorney, Agent, or Firm*—Christie, Parker & Hale, LLP (57) ABSTRACT

A propulsion system for a rocket engine and a method of cooling a rocket engine includes a propellant tank fluidically coupled to the rocket engine to hold a pressurized propellant, a coolant tank to hold a coolant, a first heat exchanger thermally coupled to the rocket engine and fluidically coupled to the coolant tank, a second heat exchanger thermally coupled to the propellant tank and fluidically coupled to the first heat exchanger, and a third heat exchanger disposed inside the propellant tank to thermally couple a propellant withdrawn from the tank for combustion to a propellant disposed inside the tank. The coolant flows from the coolant tank to the first heat exchanger and through the first heat exchanger to cool the rocket engine. The propellant withdrawn from the propellant tank receives heat from the propellant disposed inside the tank through the third heat exchanger to convert to a gaseous propellant when withdrawn from the propellant tank as a liquid propellant. The coolant flows from the first heat exchanger to the second heat exchanger and through the second heat exchanger to heat the propellant disposed inside the propellant tank.

13 Claims, 7 Drawing Sheets

SYSTEM AND METHOD FOR COOLING ROCKET ENGINES

FIELD OF THE DISCLOSURE

The present disclosure generally relates to rocket engines, and more particularly, to a cooling system for rocket engines.

BACKGROUND

Rocket engines are used for missiles, for launching space bound vehicles, and control of spacecraft in space. Rocket engines that are used to control the attitude of a spacecraft in space are generally referred to as thrusters. Firing a thruster produces a propulsive force that is opposite to the direction of the combustion gases exiting the nozzle of the thruster. The duration of firing and the timing of firing of multiple thrusters can be adjusted to impart sufficient torque on the spacecraft to obtain the desired attitude of the spacecraft. Thus, multiple thrusters are rapidly and repeatedly fired for accurate control of spacecraft attitude.

Thrusters typically use liquid monopropellants such as hydrogen peroxide ($H_2O_2$) or hydrazine ($N_2H_4$), or room temperature storable bipropellants such as nitrogen tetroxide ($N_2O_4$) and hydrazine. Because these thrusters operate in a zero gravity environment, the propellant can float in the propellant tank resulting in pressurizing gas or propellant vapor instead of liquid propellant being fed out of the propellant tank. In current practice, one means of zero-gravity feed is to use a flexible or thin metallic diaphragm, separating the pressurizing gas from the liquid propellant. Another currently practiced means of zero-gravity feed is the use of surface tension propellant acquisition devices, which draw liquid propellant towards the tank exit through capillary action.

Nitrogen tetroxide and hydrazine are toxic and environmentally hazardous. Other propellants, such as nitrous oxide ($N_2O$) and liquid oxygen ($O_2$) combined with a variety of fuels do not have these drawbacks, but there is no currently developed diaphragm tank technology for liquid oxygen and surface tension devices for nitrous oxide and liquid oxygen have not yet been demonstrated. Furthermore, surface-tension devices only operate in extremely low gravity environments, and many vehicles require a propellant feed solution which works under a range of acceleration environments and directions.

Another means of zero-gravity feed is to store the propellant in the propellant tank in a self pressurized state so that no additional pressurizing gas is required (sometimes called VaPak in the prior literature). Self-pressurized propellant by itself does not provide zero-gravity feed; however it is possible to consistently feed the gaseous form of the propellant out of the propellant tank by means of a heat exchanger between the withdrawn propellant and the tank contents. However, as the propellant is fed out of the propellant tank, the pressure of the tank drops causing the liquid part of the propellant to boil. The boiling causes heat to be drawn from the propellant to further drop the pressure of the propellant in the tank. Accordingly, in order to withdraw gaseous propellant consistently, the pressure of the tank drops significantly during use, to a degree which makes it impractical to use more than a small fraction of the tank contents in this way.

Rocket engines can be radiation cooled, which means that a rocket engine can be allowed to radiate its heat to space. The use of certain propellants, such as liquid oxygen or nitrous oxide with most fuels prohibits radiation cooling because these propellants burn very hot and radiation cooling cannot provide sufficient cooling. Certain other rocket engines circulate some of the propellant in passages in the nozzle and/or the combustion chamber to cool the rocket engine, which is called regenerative cooling. The latter cooling method, however, is not applicable to small thrusters because there is not enough cooling capacity in the propellant to cool the engine.

A solution to the above problems that currently exists is to run a coolant through the passages in the nozzle and/or the combustion chamber. The problem with this type of system, however, is that continuation of the cooling cycle may excessively heat the coolant.

SUMMARY

In accordance with one aspect of the present disclosure, a propulsion system includes a rocket engine, a propellant tank fluidically coupled to the rocket engine, a coolant tank configured to hold a coolant, a first heat exchanger thermally coupled to the rocket engine and fluidically coupled to the coolant tank, and a second heat exchanger thermally coupled to the propellant tank and fluidically coupled to the first heat exchanger. The coolant flows from the coolant tank to the first heat exchanger. The coolant flows from the first heat exchanger to the second heat exchanger.

In accordance with another aspect of the present disclosure, a propulsion system includes a rocket engine, a propellant tank fluidically coupled to the rocket engine and configured to hold a pressurized propellant, a coolant tank configured to hold a coolant, a first heat exchanger thermally coupled to the rocket engine and fluidically coupled to the coolant tank, a second heat exchanger thermally coupled to the propellant tank and fluidically coupled to the first heat exchanger, and a third heat exchanger disposed inside the propellant tank and configured to thermally couple a propellant withdrawn from the tank for combustion to a propellant disposed inside the tank. The coolant flows from the coolant tank to the first heat exchanger and through the first heat exchanger to cool the rocket engine. The propellant withdrawn from the propellant tank receives heat from the propellant disposed inside the tank through the third heat exchanger to convert to a gaseous propellant when withdrawn from the propellant tank as a liquid propellant. The coolant flows from the first heat exchanger to the second heat exchanger and through the second heat exchanger to heat the propellant disposed inside the propellant tank.

In accordance with another aspect of the present disclosure, a method of cooling a rocket engine having a propellant tank includes withdrawing propellant from the propellant tank wherein the withdrawn propellant is thermally coupled to the propellant disposed inside the propellant tank. The withdrawing causes the withdrawn propellant to receive heat from the propellant disposed in the propellant tank to convert to a gaseous propellant when the withdrawn propellant is in a liquid form. The method further includes cooling a rocket engine with a coolant, the cooling of the rocket engine causing heating of the coolant. The method also includes transferring heat from the heated coolant to the propellant disposed in the propellant tank so that a pressure of the propellant disposed in the propellant tank is maintained.

DETAILED DESCRIPTION

Figure 1:
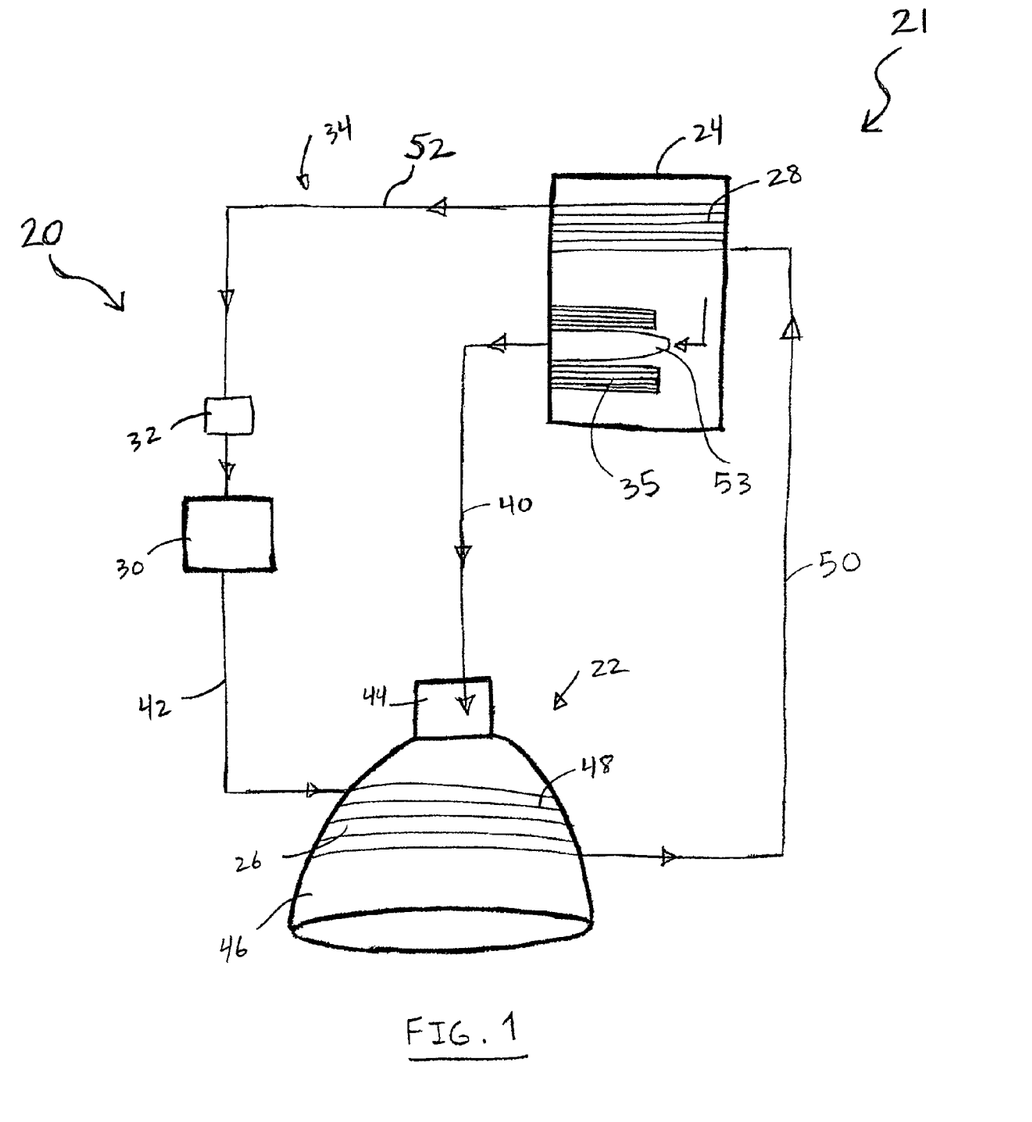
FIG. 1 is a schematic diagram of a propulsion system having a cooling system constructed in accordance with an embodiment the teachings of the present disclosure.
Figure 2:
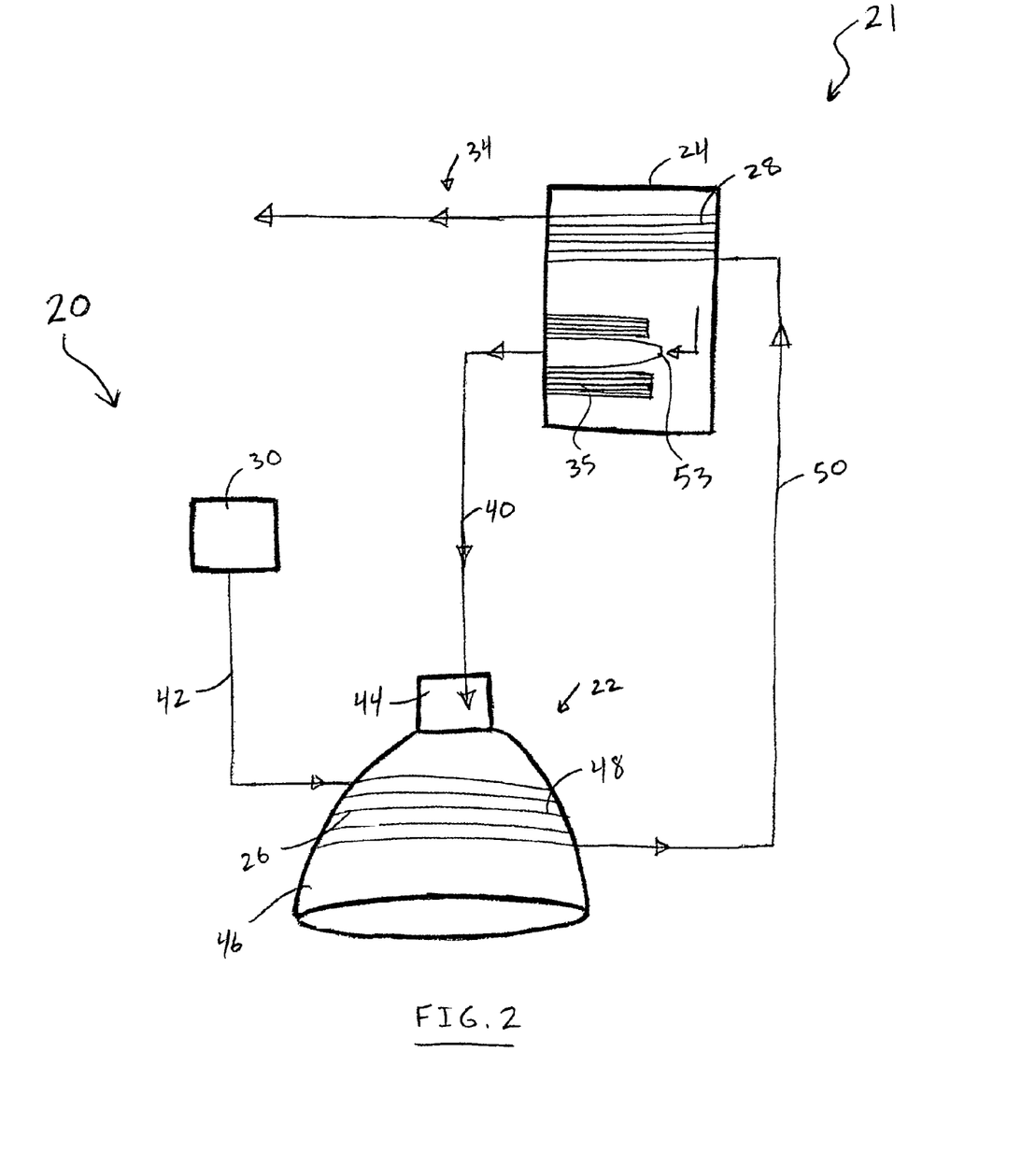
FIG. 2 is a schematic diagram of a propulsion system having a cooling system constructed in accordance with another embodiment of the teachings of the present disclosure.
Figure 3:
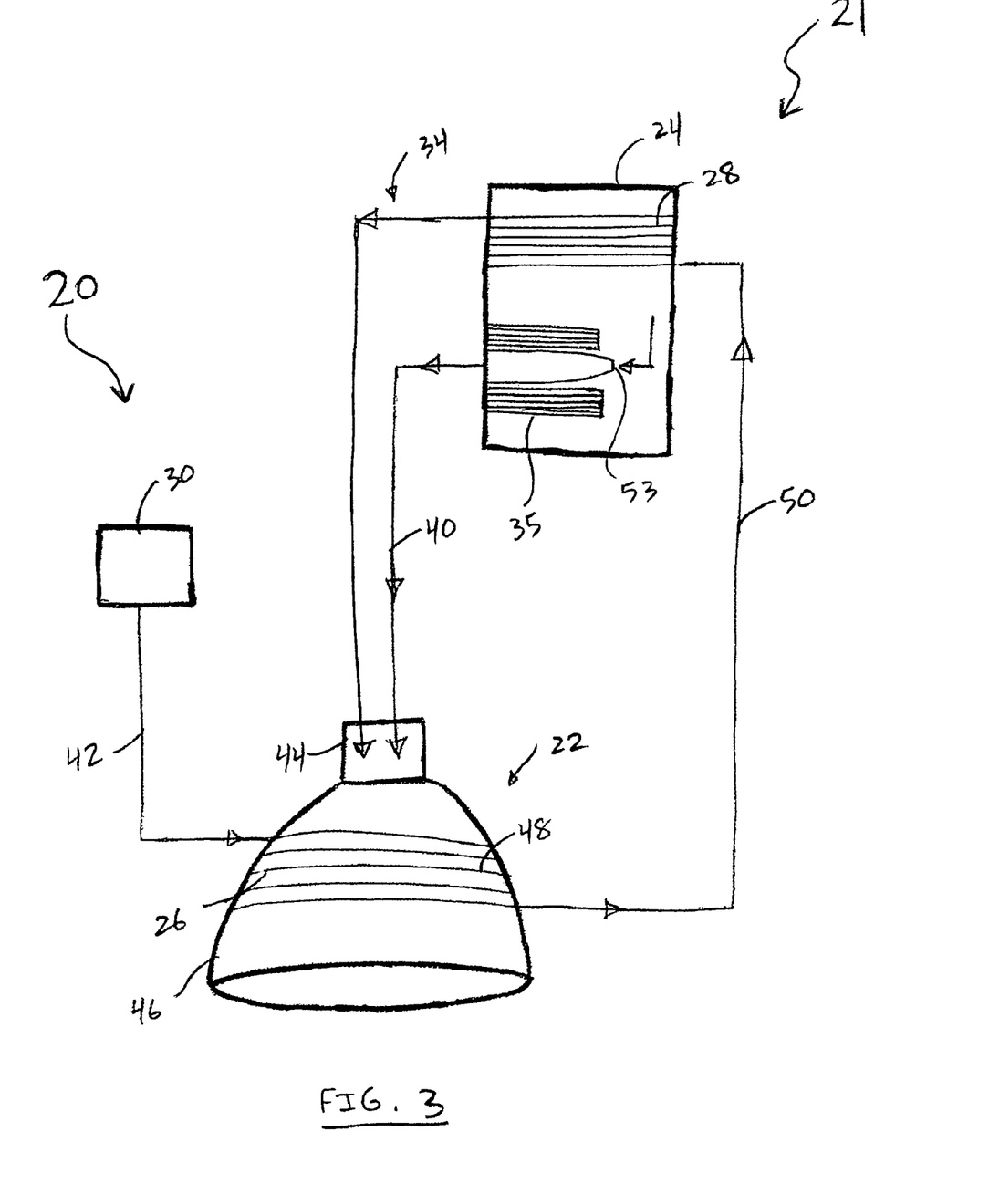
FIG. 3 is a schematic diagram of a propulsion system having a cooling system constructed in accordance with another embodiment of the teachings of the present disclosure.
Figure 5:
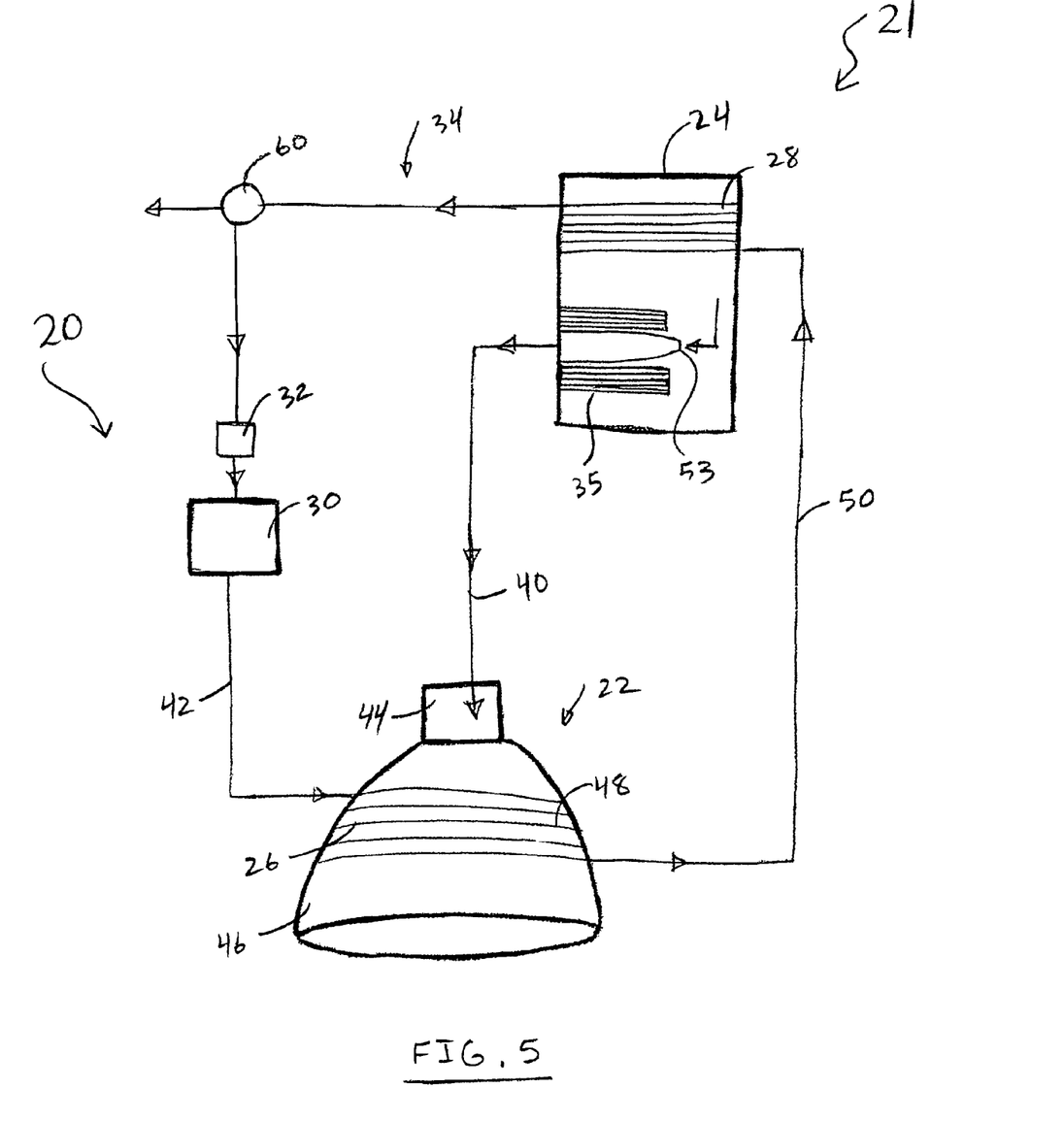
FIG. 5 is a schematic diagram of a propulsion system having a cooling system constructed in accordance with another embodiment of the teachings of the present disclosure.
Figure 6:
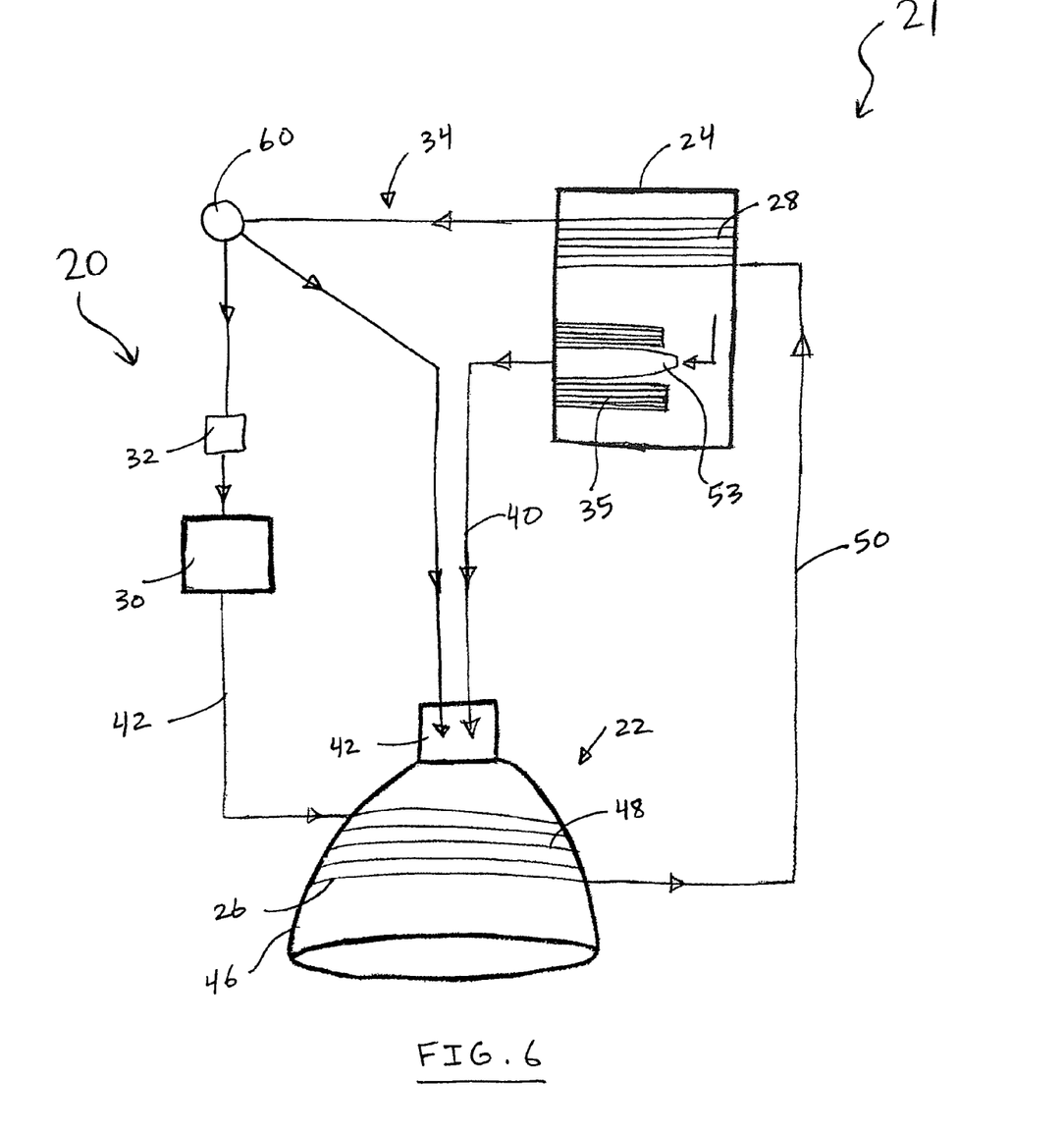
FIG. 6 is a schematic diagram of a propulsion system having a cooling system constructed in accordance with another embodiment of the teachings of the present disclosure.
Figure 7:
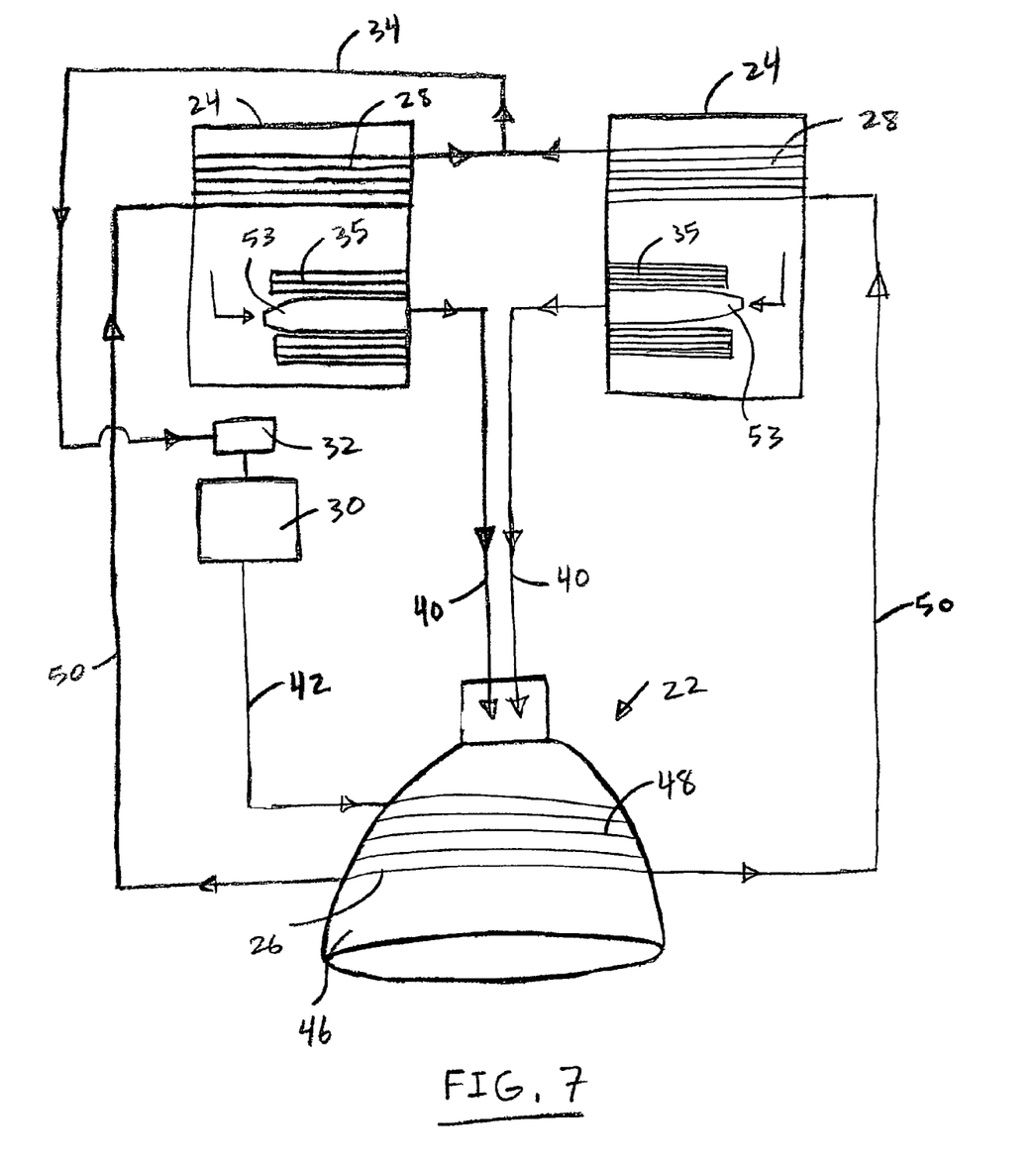
FIG. 7 is a schematic diagram of a bipropellant propulsion system having a cooling system constructed in accordance with another embodiment of the teachings of the present disclosure.

Referring to FIGS. 1-6, a cooling system 20 constructed in accordance with the teachings of the present disclosure for a propulsion system 21 is shown. The propulsion system 21 includes a rocket engine 22 and one or more propellant tanks 24, which can be in fluid communication with the rocket engine 22 to supply a propellant to the rocket engine 22 for combustion. In FIGS. 1-6, a monopropellant propulsion system is shown with only one propellant tank 24. In FIG. 7, a bipropellant propulsion system is shown having two propellant tanks 24. Accordingly, the present disclosure is applicable to any rocket engine regardless of the number and configuration of propellant tanks and oxidizer tanks used. The propulsion system 21 may also include a first heat exchanger 26 that is thermally coupled to the rocket engine 22. The cooling system 20 includes a second heat exchanger 28 that is thermally coupled to the propellant tank 24, and a coolant tank 30 configured to hold a coolant. The first heat exchanger 26 may be a component of the cooling system 20, or as noted above, a component of the propulsion system 21. The cooling system 20 also includes a flow circuit 34. As shown in FIG. 1, the closed flow circuit 34 is defined by a pump 32, the first heat exchanger 26, the second heat exchanger 28 and the coolant tank 30. The coolant returns to the coolant tank 30 with the aid of the pump 32. The pump 32 may be anywhere in the flow circuit 34. For example, the pump 32 may be before or after the coolant tank 30. The coolant may not be returned to the coolant tank 30. Accordingly, the coolant flows in the flow circuit 34, which is defined by the coolant tank 30, first heat exchanger 26 and the second heat exchanger 28, and is then either vented overboard, as shown in FIG. 2, or is dumped into the rocket engine 22, as shown in FIG. 3. As shown by example in FIGS. 4-6 and described in detail in the following, the flow circuit 34 may be constructed from a combination of the embodiments described herein.

In both the closed and the open flow circuits 34, the coolant flows from the coolant tank 30 to the first heat exchanger 26. The waste heat from the rocket engine 22 is transferred to the coolant to cool the rocket engine 22. The heated coolant transfers the heat therein to the propellant with the second heat exchanger 28, thereby causing a pressure of the propellant in the propellant tank 24 to be maintained at a desired level. The cooling system 20 may also include a third heat exchanger 35, which facilitates heat exchange between propellant being withdrawn from the propellant tank 24 and the propellant inside the propellant tank 24 so that the withdrawn propellant is in gaseous form. Any resulting cooling of the propellant in the propellant tank 24 is then countered by the heat from the second heat exchanger 28 so that the pressure in the propellant tank 24 is maintained at a desired level.

The propulsion system 21 of FIGS. 1-6 is shown to operate with a monopropellant, which includes both the fuel and oxidizer parts that are necessary for combustion. An example of a monopropellants is nitrous oxide ($N_2O$). Accordingly, the propulsion system 21 is shown to include only one propellant tank 24, in which a monopropellant is stored. The propulsion system 21, however, can also operate with a fuel and an oxidizer as separate compounds (not shown) that are mixed prior to combustion. Furthermore, the propulsion system 21 can operate as a bipropellant system. An example of such a system is shown in FIG. 7, in which parts similar to those in FIGS. 1-6 are denoted with the same reference numbers. Accordingly, the disclosed cooling system 20 is equally applicable to various types of propulsion systems.

With reference to FIG. 1, the cooling system 20 having the closed flow circuit 34 for the coolant will now be described in detail. The propellant tank 24 is connected to the rocket engine 22 with one or more conduits. In FIG. 1, a conduit 40 is schematically shown, by which the propellant tank 24 is in fluid communication with the rocket engine 22 and supplies the propellant to the rocket engine 22 for combustion. The pump 32 may be disposed at any location in the flow circuit 34 to provide pumping of the coolant in the flow circuit 34. In FIG. 1, the pump 32 is shown to be disposed in the flow circuit 34 between the second heat exchanger 28 and the coolant tank 30. The coolant flows from the coolant tank 30 to the first heat exchanger 26 through the conduit 42. The first heat exchanger 26 may be an integral part of the rocket engine 22 or a separate component that is attached to portions of the rocket engine 22 to provide cooling thereof. Typical rocket engines include a combustion chamber and a nozzle. The propellant is burned in the combustion chamber and expanded by the nozzle before being ejected from the nozzle to produce a propulsive force. In the rocket engine 22 of FIGS. 1-7, a combustion chamber 44, which is also generally referred to herein as the combustor 44, and a nozzle 46 are schematically shown. The first heat exchanger 26 may be integral with the combustion chamber 44 (not shown) or be attached to the combustion chamber 44 for cooling thereof. The heat exchanger 26 may also be an integral part of the rocket engine 22. In the example shown in FIGS. 1-7, the nozzle 46 includes passages 48 therein that can be in fluid communication with the conduit 42 to receive the coolant from the flow circuit 34. Thus, although the first heat exchanger 26, i.e., passages 48, is shown to be an integral part of the nozzle 46, the first heat exchanger 26 may also include passages that are integrally coupled to the combustion chamber 44. Alternatively, the first heat exchanger 26 may be a component that is independent from the rocket engine 22 and is a component of the cooling system 20, such that it is attached or connected to anyone of the combustion chamber 44 and the nozzle 46.

The first heat exchanger 26 facilitates transfer of heat from the combustion chamber 44 and/or the nozzle 46 to the coolant. The noted transfer of heat cools the combustion chamber 44 and/or the nozzle 46. The heated coolant is then transferred through a conduit 50 to the second heat exchanger 28. The second heat exchanger 28 is thermally coupled to the propellant tank 24. This thermal coupling may be through direct connection of the second heat exchanger 28 with the walls of the propellant tank 24, or through an indirect connection with an intermediate heat exchanger or similar heat exchange devices. The second heat exchanger 28 facilitates the transfer of heat from the heated coolant to the propellant tank 24. The heat from the propellant tank 24 is then transferred to the propellant therein.

The propellant in the propellant tank 24 may be self pressurized. Accordingly, as the propellant is consumed by the rocket engine 22, the pressure in the propellant tank 24 may drop to a level, below which flow of the propellant to the rocket engine 22 due to the pressurization of the propellant may become inconsistent. However, the heat transferred from the coolant to the propellant as described herein can maintain the pressure in the propellant tank 24 for operation of the propulsion system 21. The heat from the coolant can boil a portion of the propellant which is in liquid form to increase the pressure of the gaseous portion of the propellant. Thus, the heat for the boiling the liquid propellant is drawn from the heated coolant and is not drawn from the propellant. After transferring heat to the propellant, the coolant can be transferred from the second heat exchanger 28 to the coolant tank 30 through the conduit 52 to re-circulate in the flow circuit 34 as described above. The pump 32 facilitates the return of the coolant to the coolant tank 30.

To ensure that the propellant being withdrawn from the propellant tank 24 for combustion is in a gaseous form, the propellant tank 24 draws the propellant from the tank 24 through an outlet 53, which may be any type of orifice or other suitable outlet. As the withdrawn propellant expands to convert to a gaseous state, it draws heat from the propellant inside the propellant tank 24 through the third heat exchanger 35. Accordingly, the third heat exchanger 35 provides heat from the propellant inside the propellant tank 24 to the withdrawn propellant to ensure that the withdrawn propellant is in gaseous form. The heat exchange through the third heat exchanger 35 will cause a slight cooling or larger accumulative cooling of the propellant in the propellant tank. The cooling can contribute to a pressure drop in the tank 24. Furthermore, as the propellant is withdrawn from the tank, the pressure inside the tank 24 can drop to cause a boiling of the liquid propellant and further cooling of the tank. The noted cooling of the propellant in the propellant tank 24 may cause the pressure in the tank 24 to drop below a desired or operational pressure. However, because heat is transferred to the propellant tank 24 through the second heat exchanger 28, the pressure of the propellant in the tank 24 can be maintained at a desired level.

In some cases the heat provided to the propellant tank via the coolant flow may not be sufficient to completely vaporize the propellant. An economizer regulator (back pressure regulator) can bypass some of the propellant leaving the tank around the heat exchanger 35, such that some liquid is mixed into the propellant delivered to the conduit 40. This allows the propellant tank temperature and pressure to remain at the desired point.

Alternately, a control element, such as a pressure regulator, can be introduced in conduit 40 to control the propellant flow rate into the combustor 44. Unbalanced heat exchange can be allowed to raise or lower the average temperature of the complete coolant/propellant/tank system, and thus the propellant tank pressure, but the pressure regulator would keep the combustor's operating conditions constant, and allow the system embodied in FIG. 1 to operate for significant durations even without the extra heat rejection systems in FIGS. 2-6.

As shown in FIG. 1, all of the coolant flows from the second heat exchanger 28 through the flow circuit 34 to return to the coolant tank 30 with the aid of the pump 32. The cooling system 20 of FIG. 1 represent a scenario where the heat exchange in the flow circuit 34 is balanced. However, the heat exchange may not be balanced such that continuous circulation of the coolant in the flow circuit 34 raises the temperature of the coolant. Accordingly, some or all of the coolant may have to be removed from circulation so that warming of the coolant beyond acceptable levels is avoided. Referring to FIGS. 2-5, several embodiments of the disclosed cooling system 20 are shown in which the coolant may circulate through an open flow circuit 34 or a combination of an open and a closed flow circuit 34.

Referring to FIG. 2, after the coolant passes through the second heat exchanger 28 to heat the propellant in the propellant tank 24, the coolant may be vented overboard and not returned to the coolant tank 30. Referring to FIG. 3, after the coolant passes through the second heat exchanger 28 to warm the propellant in the propellant tank 24, the coolant may be dumped into the rocket engine 22 and not returned to the coolant tank 30. If the coolant includes a combustible material, it can be added to the combustion chamber 44 and or the nozzle 46 for combustion. An example of a combustible coolant is alcohol and/or a mixture of alcohol with other combustible and non-combustible compounds. If the coolant includes a non-combustible material, it can be added to the combustion chamber 44 and or the nozzle 46 to increase the mass flow rate of the gases exiting the nozzle to thereby increase the propulsive force of the rocket engine 22. An example of a non-combustible coolant is water. Thus, in the embodiments of the disclosed cooling system 20 shown in FIGS. 2 and 3, the coolant flows in an open flow circuit 34 where the coolant is not returned to the coolant tank 30 after passing through the second heat exchanger 28. Accordingly, the coolant from the tank 30 may be driven by the pressure in the tank 30 without using a pump 32. Optionally, however, a pump 32 may be added as described herein.

Figure 4:
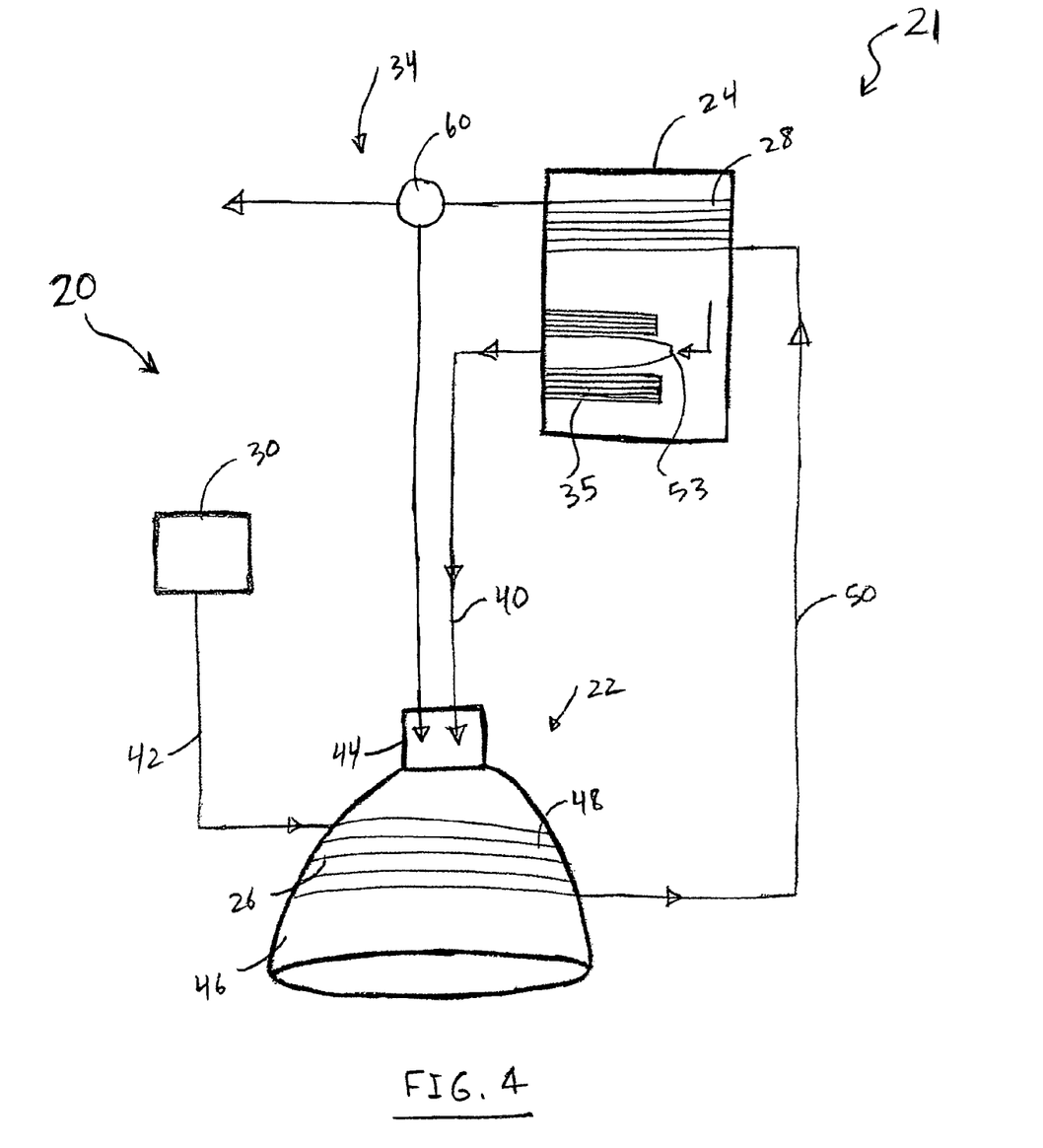
FIG. 4 is a schematic diagram of a propulsion system having a cooling system constructed in accordance with another embodiment of the teachings of the present disclosure.

The cooling system 20 may also include a combination of any two of the embodiments shown in FIGS. 1-3. For example, as shown in FIG. 4, the cooling system may include a flow control device 60 that can dump a portion of the coolant into the rocket engine 22 and vent the remaining portion of the coolant overboard. The flow control device 60 may be a passive device, such as a T-shaped flow splitter, or an active control mechanism by which the splitting of the flow can be controlled as desired. If the control device 60 is an active control device, the cooling system 20 can include sensors and controllers by which the coolant flow can be controlled to achieve desired results. In another example, as shown in FIG. 5, the control device 60 may vent a portion of the coolant overboard and send the remaining portion of the coolant back to the coolant tank 30 with the aid of the pump 32. In yet another example, as shown in FIG. 6, the control device 60 may return a portion of the coolant to the flow circuit 34 and route the remaining portion of the coolant to the engine 22 for combustion.

The cooling system 20 is described above for use with a propulsion system that uses a monopropellant. However, as described above, the cooling system 20 is equally applicable to propulsion systems that operate by one or more fuels and one or more oxidizers that are mixed prior to or during combustion. For example, in a rocket engine that uses a fuel and an oxidizer as separate stored components, the oxidizer tank can be part of the cooling system 20 as described herein, while the fuel tank may optionally be part of the cooling system 20. In yet another example, in a propulsion system having a bipropellant, as shown in FIG. 7, both propellant tanks 24 can include a second heat exchanger 28 and may include a third heat exchanger 35 to provide the above-described functionality for a monopropellant system.

The cooling system 20 of the present disclosure may be the only cooling system used in a propulsion system, or may be an auxiliary cooling system that can provide additional cooling when necessary. The cooling system 20 can be retrofitted to existing propulsion systems, in which any one of the fuel and the oxidizer is used to cool the combustion chamber and/or the nozzle. The cooling system 20 can also be retrofitted to existing propulsion systems that use radiation cooling of the combustion chamber and the nozzle. The cooling system 20 can also be an integral part of a propulsion system that can either use the cooling system 20 of the present disclosure alone or in combination with other cooling systems.

From the foregoing, it will be appreciated that the cooling system 20 of the present disclosure provides cooling of the combustion chamber and/or the nozzle while heating the self pressurized propellant or fuel and/or oxidizer to maintain the pressure in the propellant or fuel and/or oxidizer tanks.

Although not discussed or shown herein, components such as propellant and coolant control valves; pressurization, vent, and safety relief valves; filters, sensors, and test ports; and other paraphernalia common to rocket propulsion systems of the type discussed herein may be used in the disclosed system. The placement and use of these components is known to those of ordinary skill in the art and need not be duplicated here.

While a particular form of the disclosure has been illustrated and described, it will be apparent that various modifications can be made without departing from the spirit and scope of the disclosure. Accordingly, it is not intended that the disclosure be limited, except as by the appended claims.

What is claimed is:

1. A propulsion system comprising:
   a rocket engine;
   at least one propellant tank fluidically coupled to the rocket engine;
   a coolant tank configured to hold a coolant;
   a first heat exchanger thermally coupled to the rocket engine and fluidically coupled to the coolant tank; and
   a second heat exchanger that heats a propellant in the propellant tank and is fluidically coupled to the first heat exchanger,
   wherein the coolant flows from the coolant tank to the first heat exchanger, and
   wherein the coolant flows from the first heat exchanger to the second heat exchanger.

2. The propulsion system of claim 1, further comprising a third heat exchanger disposed inside the propellant tank, wherein the third heat exchanger is configured to exchange heat between a propellant withdrawn from the tank for combustion and the propellant disposed inside the tank.

3. The propulsion system of claim 1, further comprising a pump configured to return at least a portion of the coolant from the second heat exchanger to the coolant tank.

4. The propulsion system of claim 1, wherein at least a portion of the coolant from the second heat exchanger flows to the rocket engine.

5. The propulsion system of claim 4, wherein the coolant comprises a combustible material and is combusted in the rocket engine.

6. The propulsion system of claim 4, wherein the coolant comprises a non-combustible material and is injected into the rocket engine.

7. The propulsion system of claim 1, wherein at least a portion of the coolant from the second heat exchanger is vented overboard.

8. A propulsion system comprising:
   a rocket engine;
   a propellant tank fluidically coupled to the rocket engine and configured to hold a pressurized propellant;
   a coolant tank configured to hold a coolant;
   a first heat exchanger thermally coupled to the rocket engine and fluidically coupled to the coolant tank;
   a second heat exchanger thermally coupled to the propellant tank and fluidically coupled to the first heat exchanger; and
   a third heat exchanger disposed inside the propellant tank and configured to thermally couple a propellant withdrawn from the tank for combustion to a propellant disposed inside the tank;
   wherein the coolant flows from the coolant tank to the first heat exchanger and through the first heat exchanger to cool the rocket engine,
   wherein the propellant withdrawn from the propellant tank receives heat from the propellant disposed inside the tank through the third heat exchanger to convert to a gaseous propellant when withdrawn from the propellant tank as a liquid propellant, and
   wherein the coolant flows from the first heat exchanger to the second heat exchanger and through the second heat exchanger to heat the propellant disposed inside the propellant tank.

9. The propulsion system of claim 8, further comprising a pump configured to return at least a portion of the coolant from the second heat exchanger to the coolant tank.

10. The propulsion system of claim 8, wherein at least a portion of the coolant from the second heat exchanger flows to the rocket engine.

11. The propulsion system of claim 10, wherein the coolant comprises a combustible material and is combusted in the rocket engine.

12. The propulsion system of claim 10, wherein the coolant comprises a non-combustible material and is injected into the rocket engine.

13. The propulsion system of claim 8, wherein at least a portion of the coolant from the second heat exchanger is vented overboard.

* * * * *